United States Patent

Lyons et al.

[11] Patent Number: 5,525,886
[45] Date of Patent: Jun. 11, 1996

[54] LOW SPEED POSITION ESTIMATOR FOR SWITCHED RELUCTANCE MACHINE USING FLUX/CURRENT MODEL

[75] Inventors: James P. Lyons; Mark A. Preston, both of Niskayuna, N.Y.

[73] Assignee: General Electric Company, Schenectady, N.Y.

[21] Appl. No.: 263,990

[22] Filed: Jun. 23, 1994

[51] Int. Cl.⁶ .................................................. H02P 7/00
[52] U.S. Cl. .............................................. 318/701; 318/254
[58] Field of Search ................................. 318/701, 254, 318/138, 439, 716, 718, 696, 688

[56] References Cited

U.S. PATENT DOCUMENTS

| | | | |
|---|---|---|---|
| 4,868,478 | 9/1989 | Hedlund et al. | 318/696 |
| 5,043,643 | 8/1991 | Hedlund et al. | 318/254 |
| 5,059,884 | 10/1991 | Shah et al. | 318/701 |
| 5,097,190 | 3/1992 | Lyons et al. | 318/701 |
| 5,107,195 | 4/1992 | Lyons et al. | 318/701 |
| 5,268,627 | 12/1993 | Baik et al. | 318/701 X |
| 5,363,032 | 11/1994 | Hanson et al. | 318/701 X |
| 5,410,235 | 4/1995 | Ehsani | 318/701 |

*Primary Examiner*—Jonathan Wysocki
*Attorney, Agent, or Firm*—Marvin Snyder

[57] ABSTRACT

A method for estimating rotor position of a switched reluctance motor during rotor start-up or low speed operation includes applying a sequence of relatively high frequency, short duration electric probing pulses to at least two inactive excitation phase windings of a multi-phase motor. The voltage and current at each of the two inactive excitation phase windings are measured and the resultant values used to compute an estimated rotor/stator linkage/flux in each of the two excitation phase windings. The computed linkage/flux and measured phase current of the two inactive excitation windings is then used in a model to determine the rotor position. In one form, rotor position is determined by establishing a table of values representing rotor position as a function of phase current for each of a plurality of values of motor phase linkage/flux and selecting from the table a value of rotor position corresponding to the measured phase current and computed linkage/flux for the phase.

8 Claims, 7 Drawing Sheets fig. 1 fig. 2 fig. 3 fig. 4A
(PRIOR ART)

fig. 4B
(PRIOR ART)

fig. 6A fig. 6B fig. 6C fig. 6D

LOW SPEED POSITION ESTIMATOR FOR SWITCHED RELUCTANCE MACHINE USING FLUX/CURRENT MODEL

FIELD OF THE INVENTION

The present invention relates generally to switched reluctance machines and, more particularly, to a rotor position estimator for stationary or low rotor speed machine operation using a lumped parameter flux/current model of a switched reluctance machine.

BACKGROUND OF THE INVENTION

A switched reluctance machine (SRM) is a brushless, synchronous machine having salient rotor and stator poles. There is a concentrated winding on each of the stator poles, but no windings or permanent magnets on the rotor. The SRM can have various numbers of stator poles and rotor poles with the rotor having fewer poles than the stator. Common types are the 6/4 (6 stator poles, 4 rotor poles) and the 12/8. The description to follow, for simplicity, assumes a 6/4 three-phase SRM in which pairs of diametrically opposite stator pole windings are connected in series or in parallel to form an independent machine phase winding of the multi-phase SRM. Ideally, the flux entering the rotor from one stator pole balances the flux leaving the rotor from the diametrically opposite stator pole, so that there is no mutual magnetic coupling among the phases.

Torque is produced by switching current in each phase winding in a predetermined sequence that is synchronized with angular position of the rotor. In this way, a magnetic force of attraction results between the rotor poles and stator poles that are approaching each other. The current is switched off in each phase before the rotor poles nearest the stator poles of that phase rotate past the aligned position; otherwise, the magnetic force of attraction would produce a negative or braking torque. Hence, by properly energizing the phase windings relative to rotor angle, forward or reverse operation and motoring or generating operation can be obtained. Typically, the desired phase current commutation is achieved by feeding back the rotor position signal to a controller from a shaft angle transducer, e.g., an encoder or a resolver. To improve reliability and to reduce size, weight, inertia, and cost in such drives, it is desirable to eliminate this shaft position sensor. To this end, various approaches have been previously proposed for indirect rotor position sensing by monitoring terminal voltages and currents of the machine. One such approach, referred to as waveform detection, depends upon back electromotive forces (emf) and is, therefore, unreliable at low speeds and inoperative at zero speed.

Another approach to indirect rotor position sensing is disclosed in commonly assigned U.S. Pat. No. 4,772,839, issued Sep. 20, 1988 to S .R. MacMinn and P. B. Roemer, which patent is incorporated by reference herein. The cited patent describes an indirect position estimator for an SRM which applies low-level sensing pulses of short duration to the unenergized machine phases. Application of the sensing pulses results in a change in current in each of the unenergized phases. The change in current is sensed by a current sensor and an estimated inductance value is derived therefrom. A pair of estimated rotor angles corresponding to the estimated inductance value for each of the unenergized phases is ascertained. One such pair is shifted by a value equal to a known phase displacement of the other unenergized phase. The pairs of estimated angles are then compared to determine which of the angles match. An estimated instantaneous rotor angular position equal to the matching angle is produced. Moreover, in case any of the stator phase undergoes a change in state during sampling or in case two phases do not remain energized throughout the sampling, an extrapolator is provided to generate an extrapolated rotor angular position instead of the estimated position.

Still another approach to indirect rotor position sensing is disclosed in commonly assigned U.S. Pat. No. 4,959,596, issued to S. R. MacMinn, C. M. Stephens and P. M. Szczesny on Sep. 25, 1990, which patent is incorporated by reference herein. According to U.S. Pat. No. 4,959,596, a method of indirect rotor position sensing involves applying voltage sensing pulses to one unenergized phase. The result is a change in phase current which is proportional to the instantaneous value of the phase inductance. Proper commutation time is determined by comparing the change in phase current to a threshold current, thereby synchronizing phase excitation to rotor position. Phase excitation can be advanced or retarded by decreasing or increasing the threshold, respectively.

A still further approach to indirect rotor position sensing is disclosed in commonly assigned U.S. Pat. No. 5,107,195 issued to J. P. Lyons, S. R. MacMinn and M. A. Preston on Apr. 21, 1992, the disclosure of which is hereby incorporated by reference. U.S. Pat. No. 5,107,195 discloses a method and apparatus for indirectly determining rotor position in a switched reluctance motor (SRM) based on a flux/current model of the machine, which model includes multi-phase saturation, leakage, and mutual coupling effects. The flux/current model includes a network mesh of stator, rotor and air gap reluctance terms. The network is driven by magnetomotive force (mmf) terms corresponding to the ampere-turns applied to each of the stator poles. Phase current and flux sensing for each phase are performed simultaneously. The reluctance terms of the flux/current model are determined from the phase flux and current measurements. The phase current and flux measurements also determine the rotor position angle relative to alignment for each respective motor phase and which phase (or phases) is operating in its predetermined optimal sensing region defined over a range of rotor angles. The measurements on at least two phases are then used for establishing whether the stator phases of the sensing phase are approaching alignment or maximum unalignment with SRM rotor poles. Finally, the rotor position angle for the sensing phase and its position relative to alignment are used to provide a rotor position estimate for the motor.

While the method of U.S. Pat. No. 5,107,195 is preferred for determining rotor angle or position, that method is not believed sufficiently accurate at start-up or low speed ( less than about 100 RPM) operation of a 25,000 RPM SRM. Whether one uses either a flux/current map, e.g., look-up table, or solution of a lumped parameter flux/current model, the position estimate is derived from stator flux-linkage and current of the torque-producing phases with stator flux being estimated by integrating the quantity (V-IR), where V is the applied phase voltage, I is the phase current and R is the winding resistance. However, the technique is ineffective at low rotational speeds since the torque-producing current pulses are of sufficient duration to allow for significant error to accumulate in the flux integrators thus rendering the derived position estimates meaningless.

All of the methods described for determining rotor angle or position in an SRM rely on characteristics of the switched reluctance machine. For example, saliency in both the rotor and stator of a switched reluctance motor causes the SRM to have an air gap of varying effective area, and thus the phase inductance seen from the terminals of the stator phase windings is a strong function of rotor position. The current in one phase winding of a switched reluctance motor and the flux linked by that winding are related by the winding inductance through the relationship $\psi = Li$. The flux current methods for SRM rotor position estimation exploit the inherent magnetic characteristics of the SRM flux path to infer the rotor angular position.

For each SRM phase the stator flux-linkage is estimated by $\psi = \int(V-IR)$, where V is the applied phase voltage, I the phase current, and R is the winding resistance. Then, given estimated $\psi$ and measured I, the rotor position relative to alignment for each of the SRM phases can be obtained from the magnetic characteristic, or flux-current map for various rotor angles. This non-intrusive method monitors the normal torque-producing voltage and current waveforms in order to infer the rotor position. Additional logic then chooses the best available relative angle measurement and subsequently translates the relative rotor angle obtained from the magnetic characteristic into the absolute rotor angle required for commutation control of the SRM. U.S. Pat. No. 5,097,190 describes this flux-current map technique.

The flux-current map technique for determination of SRM rotor angle utilizes a single-phase magnetic characteristic as an underlying model. This model assumes that only the sensing phase is conducting current or that mutual coupling effects between conducting phases are negligible. For many applications neither of these assumptions are valid. A lumped parameter flux/current model for a three-phase switched reluctance machine can be utilized to account for mutual coupling between phases. In order to predict the rotor angle using this multi-phase model, it is necessary to sample all phase currents and flux-linkage estimates simultaneously and then solve the reluctance mesh equations to isolate the gap-tip reluctance terms $R_{gt}(\theta,\phi)$. The gap-tip reluctance function, at a known rotor flux level, can then be inverted to yield the relative angle to alignment $\theta$ for each of the stator poles—the inverse gap-tip reluctance function will most commonly be stored as a two-dimensional characteristic. The optimal absolute rotor position estimate is again obtained via post-processing logic. U.S. Pat. No. 5,107,195 describes this lumped parameter technique.

SUMMARY OF THE INVENTION

An object of the present invention is to provide a method for determining rotor position of a switched reluctance machine at stand-still or low rotational speed.

Another object is to provide a method for determining rotor position of a switched reluctance machine at standstill by applying high frequency probing voltage pulses to all phases of the machine and inferring rotor position from measured phase current and estimated winding flux-linkage.

Another object is to provide a method for determining rotor position of a switched reluctance machine while operating at low speed by applying high frequency probing voltage pulses to the inactive nontorque-producing phases and inferring rotor position from measured phase current and estimated winding flux linkage.

In an illustrative form, the invention utilizes high frequency voltage pulses applied to inactive machine phases in order to circumvent the low frequency limitations of the flux-linkage integrators. The voltage pulses are designed to be long enough in duration to ensure measurable current and to allow high-frequency eddy currents to decay down, while also being short enough in duration to prevent integrator windup and prevent significant torque production by the phases being probed. The on-to-off duty cycle ratio of the pulses must be chosen to ensure that the current and flux will decay to zero prior to an ensuing test pulse, thus allowing the flux integrators to be periodically reset to a known value (i.e. zero).

Upon initialization, an SRM control system in accordance with the present invention will either initially locate the rotor (assuming the machine is stopped) or begin to track a rotor that is already rotating by applying a sequence of synchronized high frequency test pulses to all motor phases. At the end of the voltage-on cycle the flux-linkage and current for each of the phases is sampled and the rotor position calculated using either of the aforementioned single and multi-phase flux-current techniques. A short sequence of such test pulses is sufficient to establish the initial operating state of the SRM control system (i.e., rotor position and velocity).

Once the rotor is initially located, a stopped SRM is started through a sequence of torque-producing current pulses applied sequentially to the appropriate machine phases. For the initial few cycles the rotor speed and hence stator electrical frequency are too low to rely on the flux integrators for these torque-producing phases. In order to locate the rotor as it begins to spin the nontorque-producing phases continue to be probed with synchronized high-frequency voltage pulses. At the end of the voltage-on cycle the flux-linkage and current for each of the probed phases is sampled and the rotor position inferred using either the single or a modified multi-phase flux-current technique. The multi-phase technique must be modified in order to ignore the unknown flux-linkage corresponding to the torque-producing phases(s). This is done by assuming that the unknown flux-linkage is zero, thus effectively reducing the multi-phase coupled reluctance model to a single phase reluctance model.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 4A:
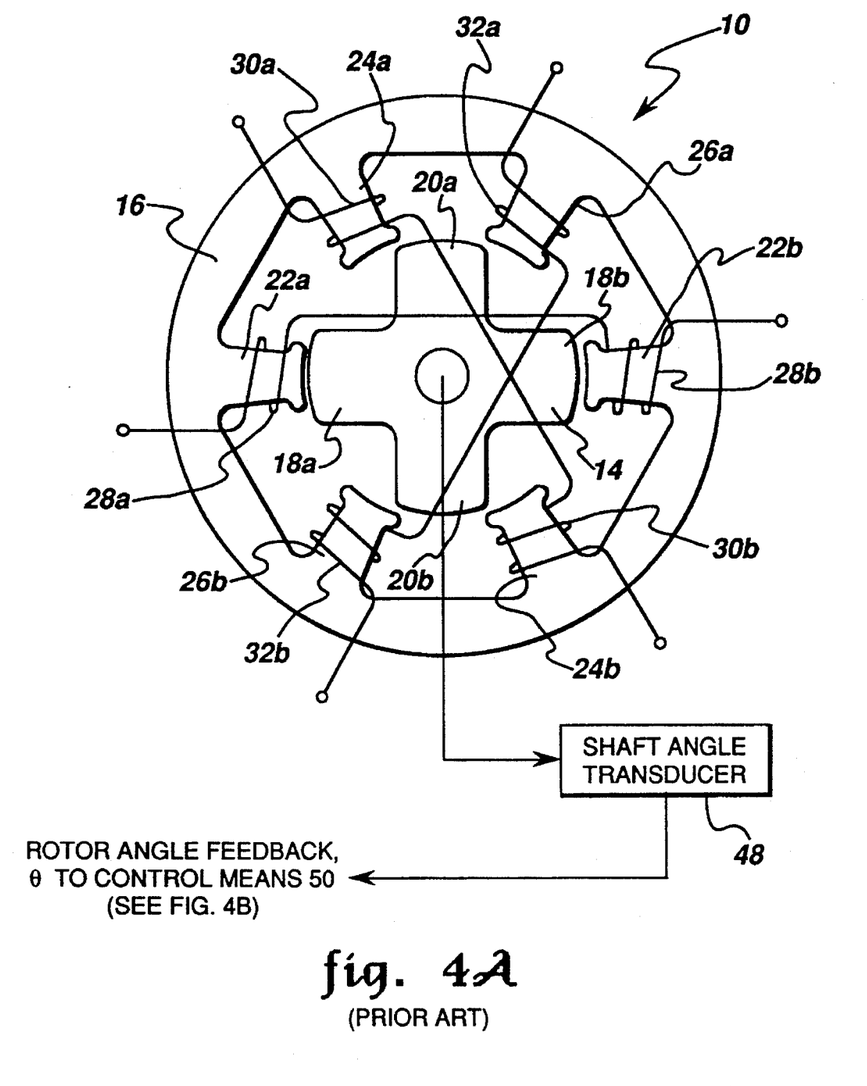
FIG. 4A is a schematic illustration of a conventional SRM drive.

Reference is first made to FIG. 4A, which shows an exemplary form of a switched reluctance machine (SRM)

Figure 4B:
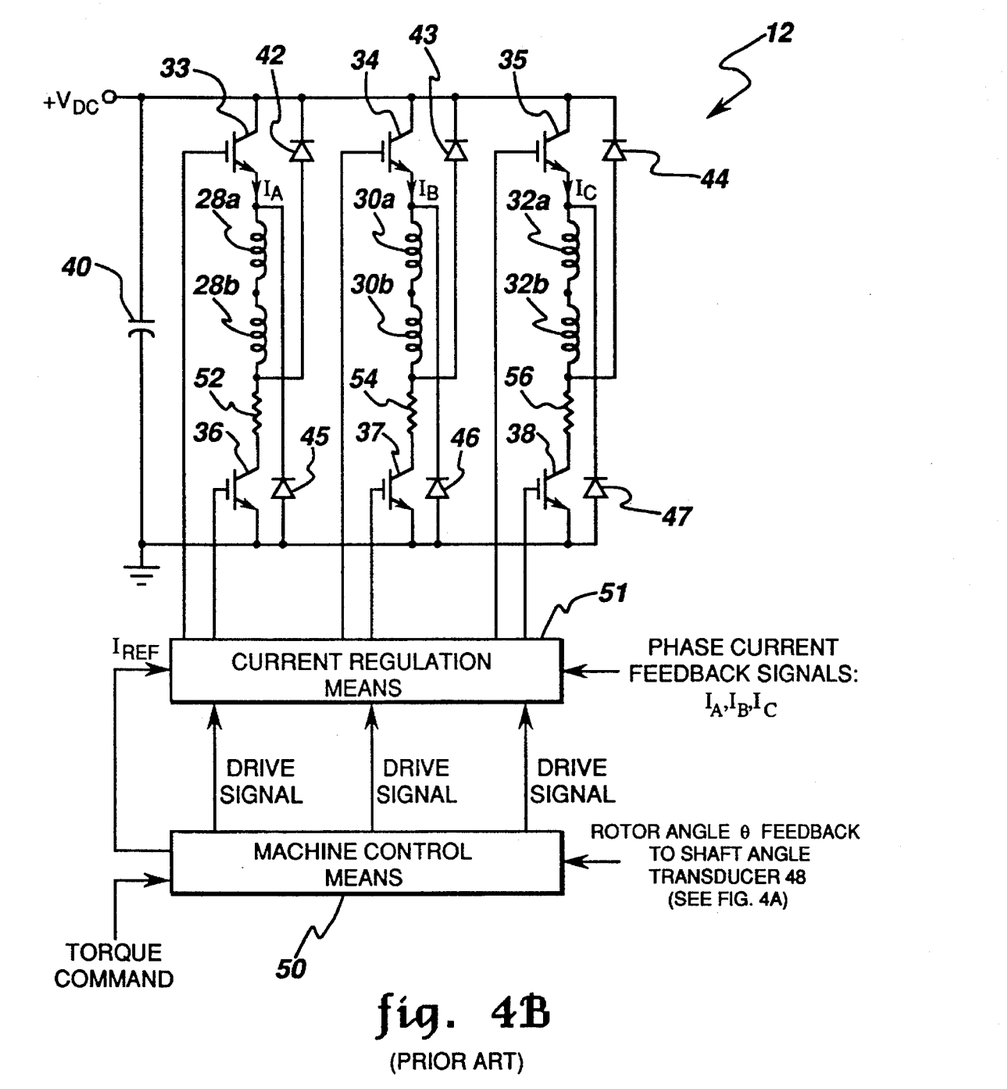
FIG. 4B schematically illustrates one form of power control system for the motor of FIG. 1A.

10, and FIG. 4B, which illustrates a drive or power system for SRM 10. By way of example, SRM 10 is illustrated as a three-phase machine with its associated power inverter 12. As shown, SRM 10 includes a rotor 14 rotatable in either a forward or reverse direction within a stationary stator 16. Rotor 14 has two pairs of diametrically opposite rotor poles 18a–18b and 20a–20b. Stator 16 has three pairs of diametrically opposite stator poles 22a–22b, 24a–24b and 26a–26b. Stator pole windings 28a–28b, 30a–30b and 32a–32b, respectively, are wound on stator pole pairs 22a–22b, 24a–24b and 26a–26b, respectively. Conventionally, the stator pole windings on each pair of opposing or companion stator pole pairs are connected in series or parallel to form a machine phase winding. The stator pole windings comprising each companion pair 28a–28b, 30a–30b and 32a–32b, respectively, are connected in series with each other and with an upper current switching device 33,34 and 35, respectively, and with a lower current switching device 36,37 and 38, respectively. Each of the upper and lower switching devices is illustrated as comprising an insulated gate bipolar transistor (IGT), but other suitable current switching devices may be used instead; for example, field effect transistors (FETs), gate turn-off thyristors (GTOs), or bipolar junction transistors (BJTs). Each phase winding is further coupled to a dc source, such as a battery, or a rectified ac source, by flyback or return diodes 45 and 42, 46 and 43, and 47 and 44, respectively. At the end of each conduction interval of each phase, stored magnetic energy in the respective phase winding is returned, through the respective pair of flyback or return diodes connected thereto, to the dc source. Each series combination of the phase winding with two corresponding switching devices and two flyback diodes comprises one phase leg of inverter 12. The inverter phase legs are connected in parallel with each other and are driven by the dc source, which impresses a dc voltage $V_{dc}$ across the parallel inverter phase legs. Capacitance 40 is provided for filtering transient voltages from the dc source and for supplying ripple current to the inverter.

Typically, a shaft angle transducer 48, e.g. an encoder or a resolver, is coupled to rotor 14 for providing rotor angle feedback signals to machine control means 50. An operator command, such as a torque command, is also generally supplied as an input signal to control means 50. Phase current feedback signals are supplied to a current regulation means 51 which receives phase current feedback signals $I_A$, $I_B$ and $I_C$ from current sensors 52, 54 and 56, respectively. Suitable current sensors are well known in the art and may comprise, for example, Hall-effect sensors, sensing transformers, sensing transistors, or sensing resistors. Control means 50 further provides a commanded reference current waveform $I_{REF}$ to current regulation means 51, as described in commonly assigned U.S. Pat. No. 4,961,038, issued to S. R. MacMinn on Oct. 2, 1990, which patent is incorporated by reference herein. In well-known fashion, such as described in commonly assigned U.S. Pat. No. 4,739,240, issued to S. R. MacMinn and P. M. Szczesny on Apr. 19, 1988, which patent is also incorporated by reference herein, control means 50 provides firing signals (i.e. drive signals) to inverter 12 for energizing the machine phase windings in a predetermined sequence, depending upon the particular quadrant of operation.

Figure 5:
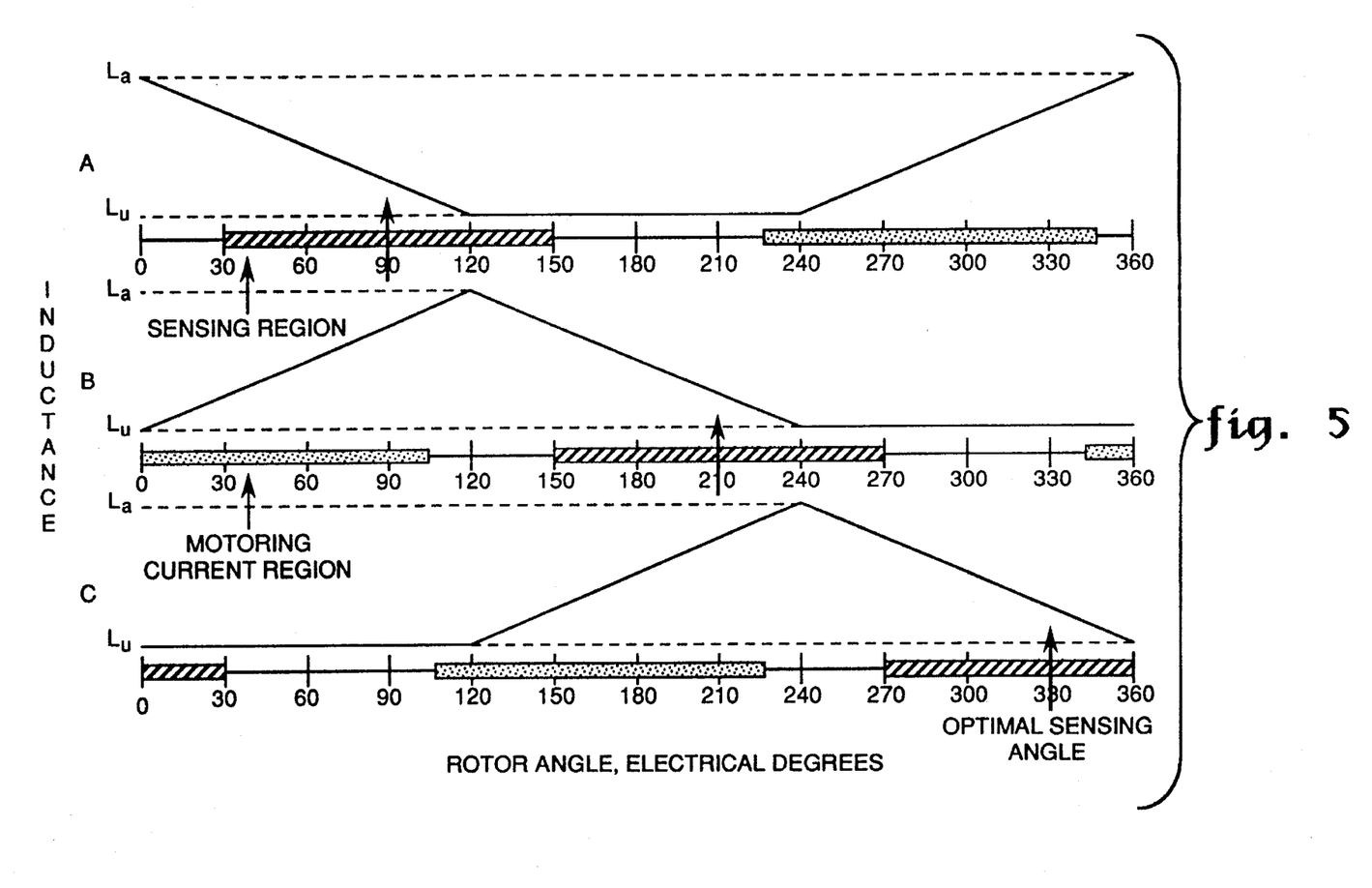
FIG. 5 is a graphical illustration of phase inductance versus rotor angle which shows the sensing regions for each respective phase for a three-phase SRM.

Saliency of both the rotor and stator of a SRM causes the machine to have an air gap of varying length. As a result, phase inductance as viewed from the stator phase windings is a strong function of rotor position. Specifically, as shown in FIG. 5, idealized phase inductance for each phase A, B and C ranges from a maximum value $L_a$, corresponding to alignment of rotor poles with the stator poles of the respective phase, to a minimum value $L_u$, corresponding to maximum unalignment of rotor poles with the stator poles of the respective phase.

Figure 1:
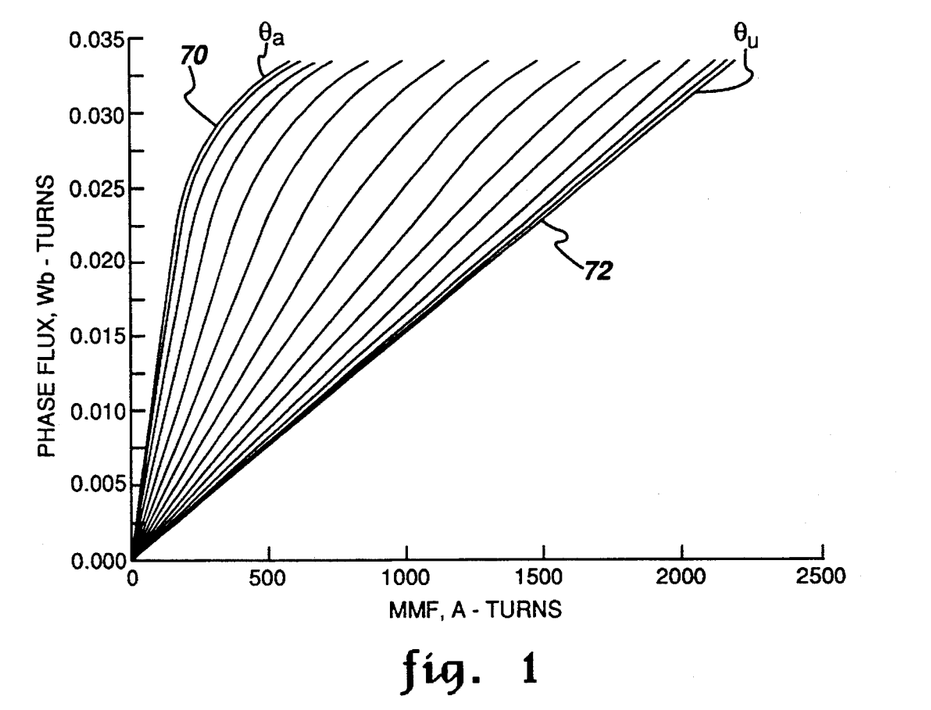
FIG. 1 is a flux-current map, or graphical illustration of phase flux versus phase current, for different values of rotor angle.

The current I in one phase winding of a SRM and the flux $\psi$ linked by that winding are related by the winding inductance L according to the expression: $\psi = LI$. Thus, if phase flux linkage $\psi$ is plotted against phase current I, the slope of the resulting curve is the phase inductance. FIG. 1 graphically illustrates phase flux $\psi$ versus magnetomotive force (mmf, in ampere-turns) for various values of rotor angle $\theta$, in electrical degrees. (As will be appreciated by those skilled in the art, in an SRM having a three-phase, 6-4 pole configuration, such as that illustrated in FIG. 4A, a mechanical degree is one-fourth of an electrical degree. However, since electronic commutation is the concern herein, all positions will be described in terms of electrical degrees.) In FIG. 1, the bending of the curves at the higher values of flux $\psi$ is caused by magnetic saturation of the iron in the motor. Curve 70, which has the steepest initial slope, represents the $\psi$-I curve for the excited phase when the stator poles of that phase are aligned with rotor poles, the rotor angle corresponding thereto being designated as $\theta_a$. On the other hand, curve 72, which has the smallest initial slope, represents the $\psi$-I curve for the excited phase when the stator poles of that phase are at the point of maximum unalignment with rotor poles of the SRM, the rotor angle corresponding thereto being designated as $\theta_u$. The curves falling between curves 70 and 72 represent intermediate inductance values corresponding to varying degrees of rotor and stator pole overlap, with the slopes of the curves monotonically decreasing as the rotor advances from the aligned position to the unaligned position.

Figure 2:
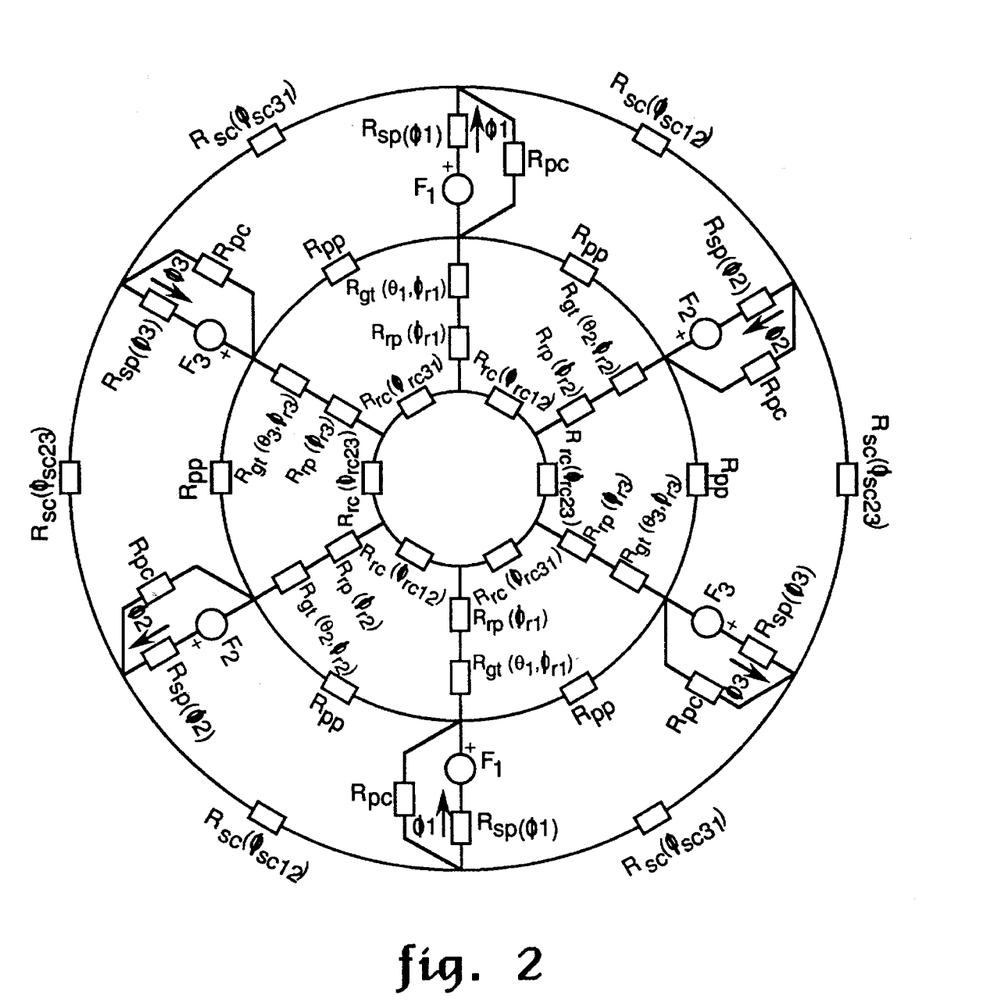
FIG. 2 illustrates a lumped parameter flux/current model useful in determining rotor position in accordance with the method of the present invention.

FIG. 2 shows a lumped parameter magnetic model of a three-phase SRM, such as that shown in FIG. 4A, which accounts for mutual coupling between the phases thereof in accordance with the present invention. As illustrated, the model comprises a network mesh of stator, rotor, and air gap reluctance terms. Specifically, the reluctance components of the model are defined as follows:

$R_{sc}(\phi)$ = stator core reluctance: a saturable component representing the stator core flux path.

$R_{sp}(\phi)$ = stator pole reluctance: a saturable component representing the stator pole base flux path.

$R_{pc}$ = stator pole-to-core reluctance: a nonsaturable component representing the stator pole and three-dimensional end leakage flux paths.

$R_{pp}$ = stator pole-to-pole reluctance: a nonsaturable component representing the leakage flux path between adjacent stator poles.

$R_g(\theta)$ = air gap reluctance: a nonsaturable component representing the stator-to-rotor air gap flux path, a function of the rotor angle $\theta$ relative to alignment.

$R_t(\theta,\phi)$ = pole tip reluctance; a saturable component representing the flux path through both rotor and stator pole tips.

$R_{gt}(\theta,\phi)$ = air gap and pole tip reluctance: the sum of $R_g(\theta)$ and $R_t(\theta,\phi)$.

$R_{rp}(\phi)$ = rotor pole reluctance; a saturable component representing the rotor pole base flux path.

$R_{rc}(\phi)$ = rotor core reluctance: a saturable component representing the rotor core flux path.

The model of FIG. 2 is driven by mmf terms $F_1$, $F_2$ and $F_3$, corresponding to the ampere-turns applied to each of the respective stator poles. The stator pole flux density terms $\phi_1$, $\phi_2$ and $\phi_3$ resulting from this excitation are determined from phase current and phase flux measurements. In accordance with the present invention, the phase current and phase flux measurements are made for each phase simultaneously. Specifically, for each phase i,:

$$\theta_i = \frac{\psi_i}{N}$$

where $\psi_i$ is determined from measurements of phase voltage and current and N represents the number of ampere-turns for each respective phase winding.

Figure 3:
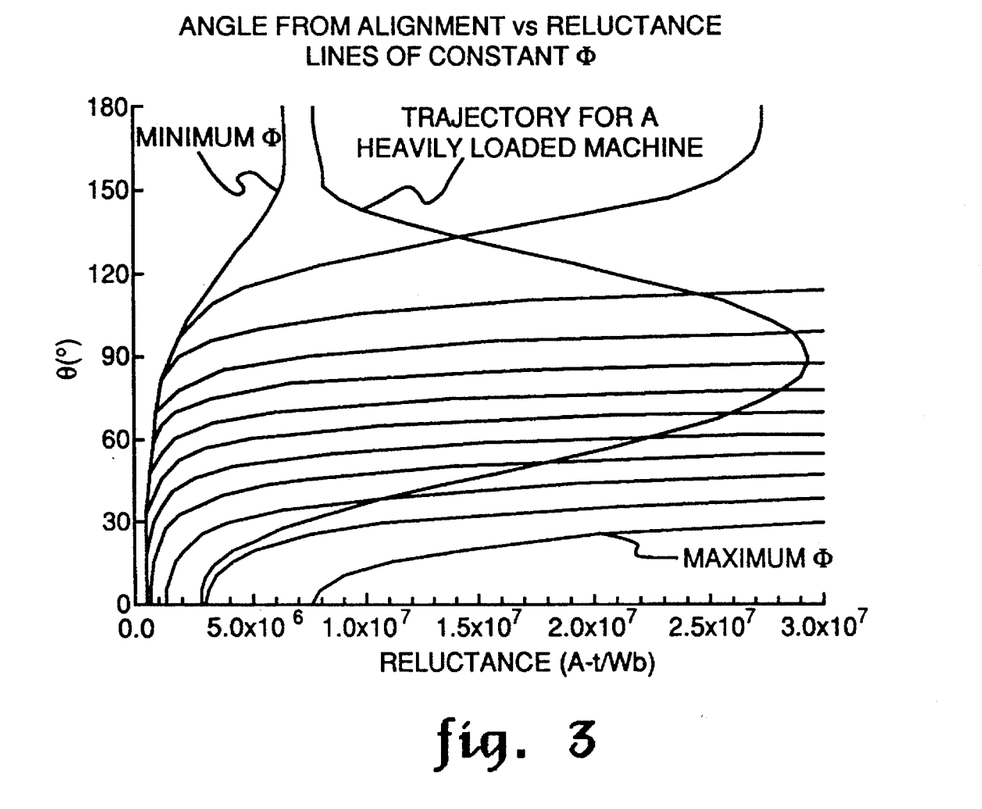
FIG. 3 is a graphical illustration of rotor angle versus alignment for different values of flux.

To predict the rotor angle using the multi-phase model of FIG. 2, all phase currents and flux-linkage estimates are sampled simultaneously and the reluctance mesh equations are then solved to isolate the gap-tip reluctance terms $R_{gt}$ ($\theta,\phi$). The gap-tip reluctance function, at a known rotor flux level, is then inverted to yield the relative angle to alignment $\theta$ for each of the stator poles. The inverse gap-tip reluctance function may be stored as a two-dimensional characteristic, as illustrated in FIG. 3, and the optimal absolute rotor position estimate is again obtained via post-processing logic.

The evaluation of the values of the various elements are described in detail in the aforementioned U.S. Pat. No. 5,107,195 and incorporated by reference. The method described therein is applied in the present invention in which probing pulses are coupled to the windings of an SRM at speeds below the range in which the torque-producing pulses can be used, typically about 100 RPM.

Figure 6A:
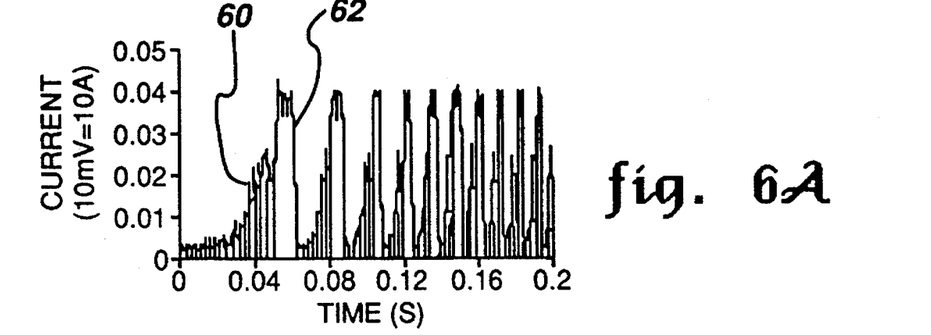
FIGS. 6A–6C illustrate the probing pulses and phase energizing current waveforms applied to each phase of a three-phase motor.
Figure 6B:
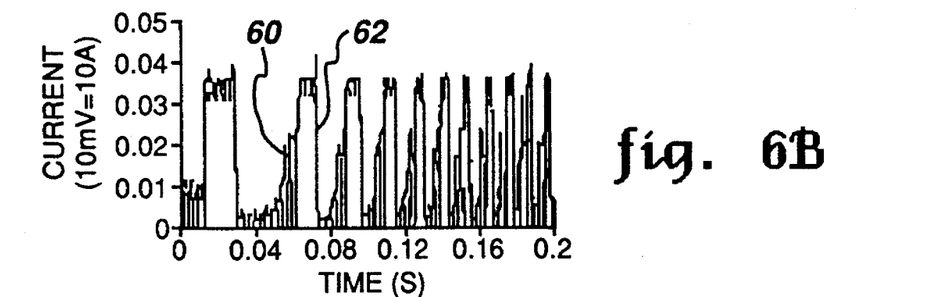
Figure 6C:
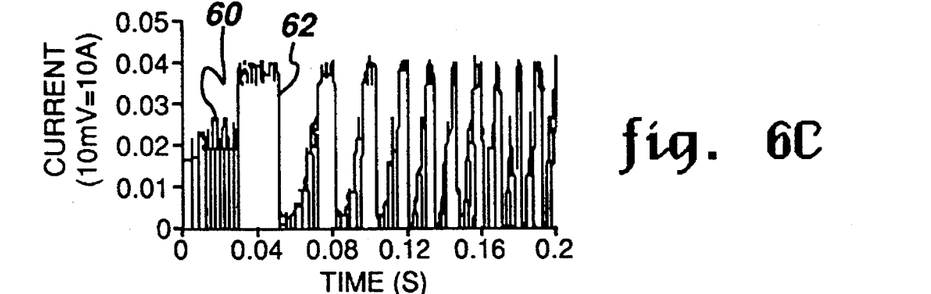
Figure 6D:
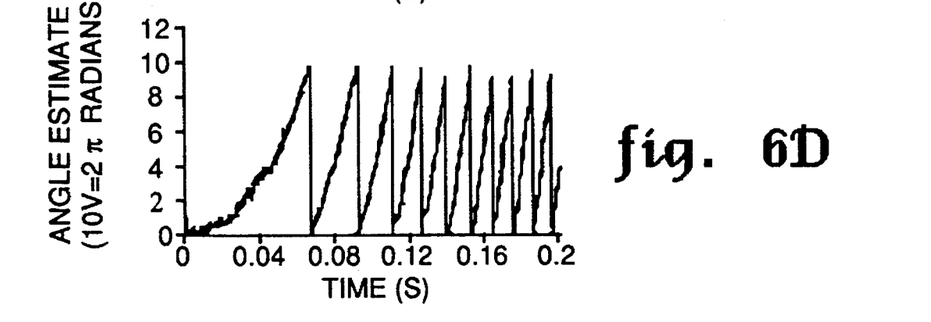
FIG. 6D illustrates the calculated angle (rotor position) obtained from the measured current pulses.

Referring to FIG. 4B in conjunction with FIGS. 6A–6D, machine control means 50 generates short duration, high frequency (with respect to the torque-producing pulses) probing pulses 60 on phase windings 28a, 28b, 30a, 30b, 32a and 32b. A typical probing pulse for 25,000 RPM, 12/8 SRM of 15 horsepower operating normally from 270 volts is a 270 volt DC, 100 microsecond ON and 300 microsecond OFF pulse. The initial sequence is twenty probing pulses which enables the controller to determine rotor position in the manner described in U.S. Pat. No. 5,097,190. In the above example, the rotor angle is such that phase B is initially excited with a torque-producing pulse, FIG. 6B, followed by excitation of phase C, FIG. 6C, and then phase A, FIG. 6A. The energizing sequence B,C,A then continues until the motor has reached a speed at which the torque-producing pulses 62 become sufficiently narrow to reduce integrator errors to a tolerable level, typically at about 100 RPM for a 25,000 RPM three-phase SRM. If the SRM drive is required to operate at low speeds, such as in a servo-mechanism, the controller or control means 50 is programmed to initiate probing pulses whenever motor speed falls below the threshold value, i.e., about 100 RPM. As shown in FIGS. 4A–4C, the probing pulses 60 are produced between the torque-producing pulses, i.e., the probing pulses are applied to the nonexcited windings. The angle estimate or rotor position with respect to the phase A pole pair is shown in FIG. 6D. The estimated angle increases up to alignment at each $2\pi$ radians and then resets to zero.

The probing pulses 60 may be generated in any conventional manner and applied to the nonexcited windings between torque-producing pulses. One method of exciting SRM windings with probing pulses is described in the aforementioned U.S. Pat. No. 4,772,839. During starting of SRM 10, one phase at a time is energized with torque-producing pulses and the remaining two are available for probing pulses. As shown in FIG. 5, the torque-producing pulses are spaced at 120 electrical degrees so that the optimal sensing regions for probing pulses are 120 degrees in width, centered at 90 degrees relative to phase alignment. FIG. 5 illustrates the motor torque-producing regions by the dark, heavy lines on the angle abscissa and the current sensing region by the cross-hatch area on the angle abscissa, both being shown as a function of SRM phase inductance which is directly related to rotor position.

The foregoing describes a method for determining rotor position in an SRM using a flux/current motor model and probing pulses during start-up and low speed operation.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. A method for estimating rotor position of a switched reluctance machine during rotor start-up, the machine including a stator having a plurality of pairs of opposing stator poles and a rotor having a plurality of rotor poles, each opposing pair of the stator poles defining a respective excitation phase of the machine and having a phase winding wound thereon for receiving excitation energy at predetermined intervals, the method comprising the steps of:

applying a sequence of relatively high frequency electric probing pulses to at least two inactive excitation phase windings of the machine, said pulses being of duration long enough to ensure that measurable current is induced in the two inactive excitation windings but short enough to avoid significant torque production by the two inactive excitation windings;

sensing voltage and current at each of the two inactive excitation phase windings after completion of the sequence of probing pulses applied thereto;

computing an estimated rotor/stator flux-linkage in each of the two inactive excitation phase windings from the sensed voltage and current; and determining from the phase current and computed flux-linkage of each of the two inactive excitation windings the position of the rotor of the machine.

2. The method of claim 1 wherein the step of determining comprises the steps of:

establishing a table of values representative of position of the rotor as a function of phase current for each of a plurality of values of motor phase flux-linkage; and selecting from the table a value of rotor position corresponding to sensed phase current and computed phase flux-linkage.

3. The method of claim 1 wherein the step of determining comprises the steps of:

creating a lumped parameter model for the motor;

computing air gap reluctance values as a function of rotor angle for the model; and determining angular position of the rotor from the computed air gap reluctance.

4. The method of claim 3 wherein the step of determining the rotor angular position comprises the step of selecting a rotor angle from a look-up table containing rotor angles as a function of air gap reluctance.

5. The method of claim 1 wherein the machine has at least three phases and each of the phases is excited by the probing pulses when the machine is stopped.

6. The method of claim 5 wherein the machine comprises a switched reluctance motor and energization power for the motor is applied to one phase of the motor, the step of determining further including the step of first discarding sensed voltage, current and computed flux-linkage for the one phase before determining rotor position.

7. The method of claim 6 wherein the probing are applied concurrently to all phases.

8. The method of claim 1 wherein the probing pulses are applied while the machine is rotating at a speed below the range in which excitation energy in the form of torque-producing pulses can be used to determine rotor position.

* * * * *